United States Patent [19]

Tapp

[11] 4,163,566
[45] Aug. 7, 1979

[54] STEERING MECHANISM

[75] Inventor: Geoffrey E. E. Tapp, Farnham, England

[73] Assignee: County Commercial Cars Limited, Aldershot, England

[21] Appl. No.: 863,575

[22] Filed: Dec. 22, 1977

[30] Foreign Application Priority Data

Dec. 31, 1976 [GB] United Kingdom ............... 54514/76

[51] Int. Cl.² .............................................. B62D 7/16
[52] U.S. Cl. ..................................................... 280/91
[58] Field of Search .......................... 280/91, 99, 103; 74/516, 484; 180/140

[56] References Cited

U.S. PATENT DOCUMENTS 2,042,482  6/1936  Ransom .................................. 280/91

FOREIGN PATENT DOCUMENTS 1804715  6/1969  Fed. Rep. of Germany ............. 280/91
337411  10/1930  United Kingdom ...................... 280/91
523656  7/1940  United Kingdom ...................... 280/91
1141881  2/1969  United Kingdom ...................... 280/91

Primary Examiner—Joseph F. Peters, Jr.
Assistant Examiner—R. Schrecengost
Attorney, Agent, or Firm—Young & Thompson

[57] ABSTRACT

A steering mechanism for a vehicle having steered front and rear wheels, comprises steering linkages for connection to both sets of wheels. The steering linkage to the rear set of wheels includes a variable length lever and a link mechanism to vary the length of the lever in response to the amount of steering movement imparted to the steering connection to the front wheels. The variable length lever mechanism is such that the amount of steering movement transmitted to the rear wheels for a given amount of steering movement imparted to the front wheels is greater when the front wheels approach full lock than when the front wheels are moving from the straight ahead position.

7 Claims, 9 Drawing Figures

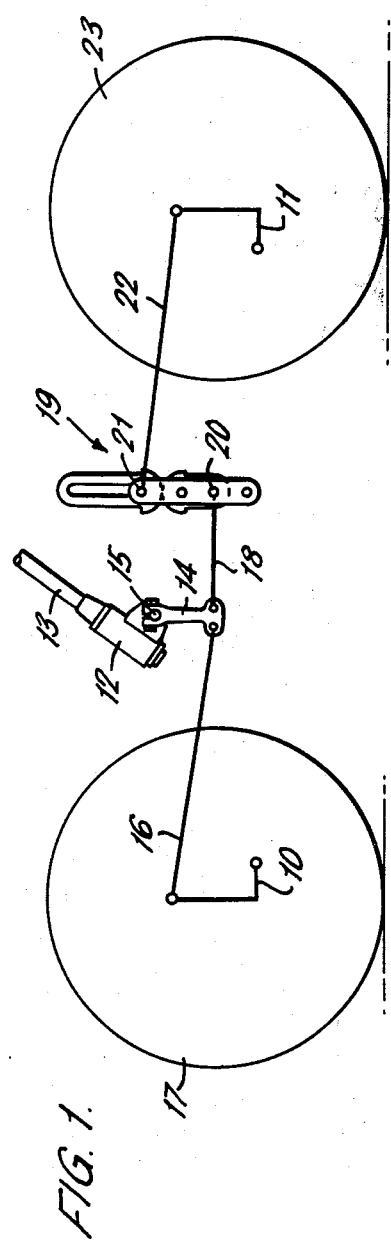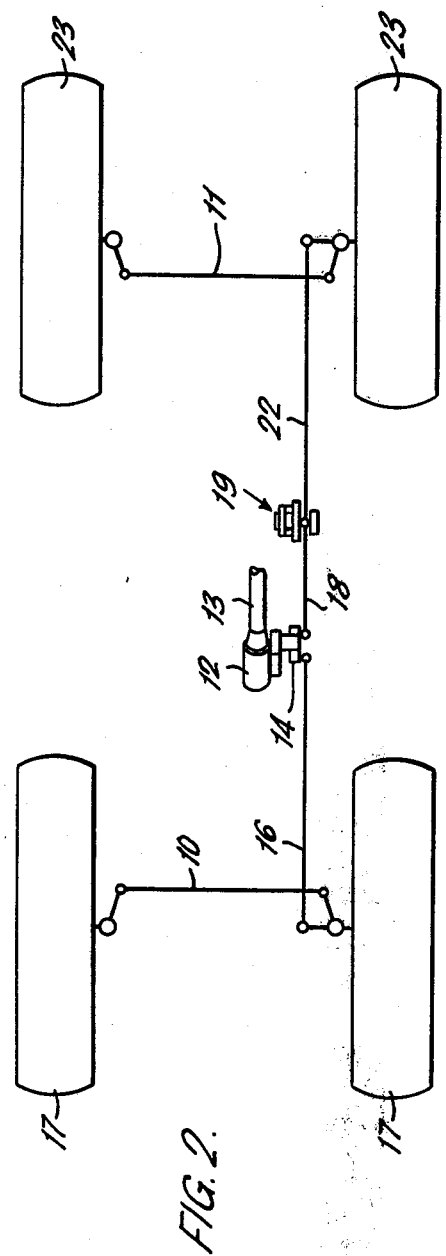

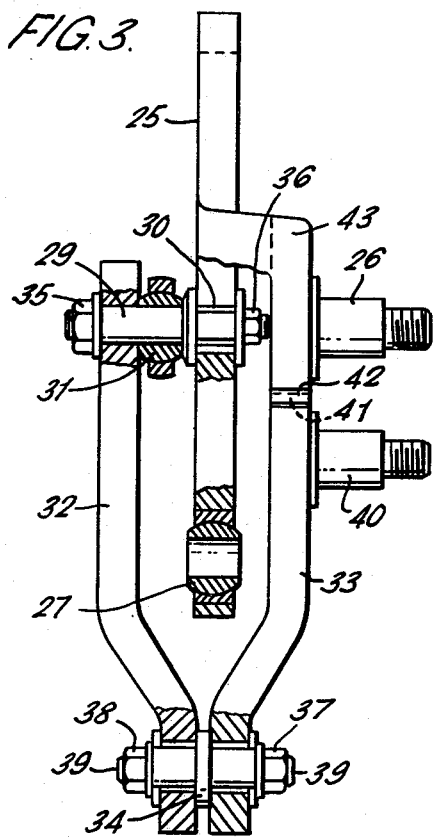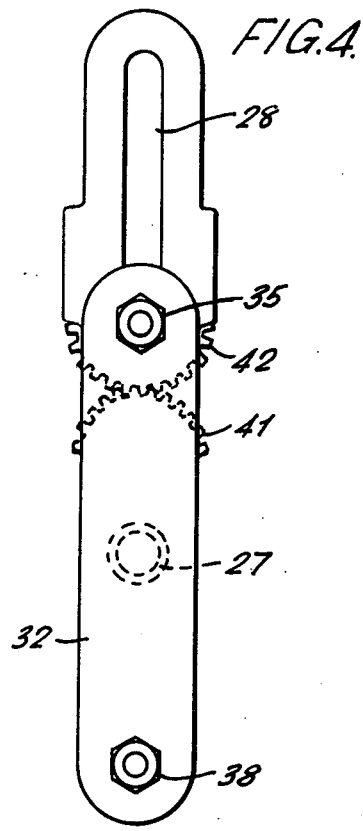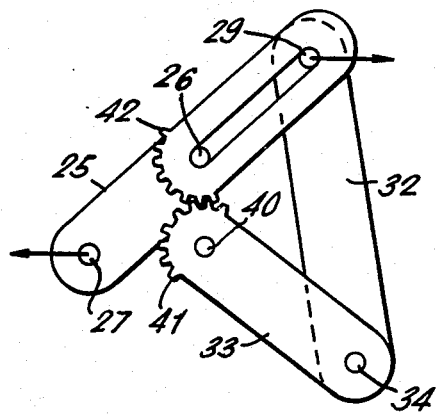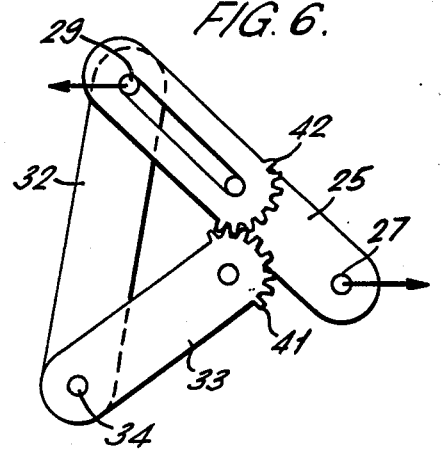

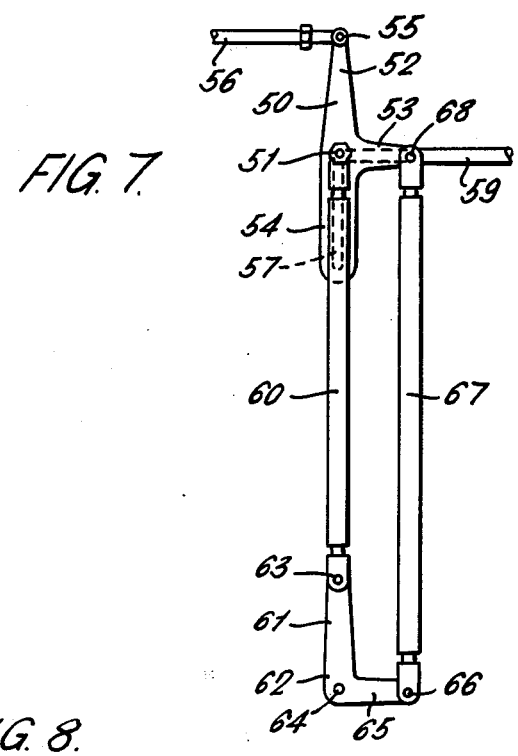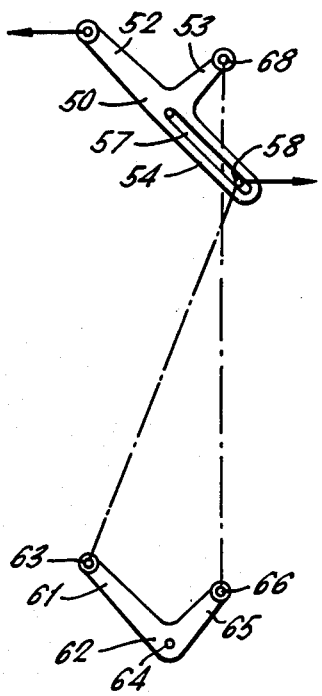

0
STEERING MECHANISM

BACKGROUND OF THE INVENTION

The invention relates to steering mechanisms for wheeled vehicles and more particularly but not exclusively for four wheel drive vehicles.

In both agricultural and industrial vehicles it is desirable to achieve a small turning circle. It may be difficult to achieve a desired turning circle by means of front wheel steering alone, since the angle through which the front wheels can turn is limited. A reduced turning circle can be achieved by means of four wheel steering.

Four wheel steering, however, has undesirable effects when driving at speed owing to the instability created, but when travelling at speed it is generally the case that only small deviations are required from the straight ahead direction in comparison to a full lock required when, for example, a tractor is negotiating a sharp turn.

SUMMARY OF THE INVENTION

According to the invention there is provided a steering mechanism for a vehicle having steered front and rear wheels, said mechanism comprising steering linkages for connection to both sets of wheels, the steering linkage to one of the sets of wheels including a variable length lever and means to vary the length of the lever in response to the amount of steering movement imparted to the connection to the other set of wheels. The term variable length lever is intended to include any lever rotatable about a fulcrum pivot and having pivot connections along the lever, one to an input and the other to an output, the effective length of the lever being raised by altering the position of one or more of these three pivots.

The variable length lever may comprise a lever pivotally mounted on a pivot, means for exerting a force on the lever to rotate the lever, and means slightly mounted on the lever for transmitting a steering force to said one set of wheels in response to rotational movement of the lever.

The means to vary the length of the lever may comprise a link mechanism for controlling the position of said slidably mounted force transmitting means on the lever in response to rotation of the lever. The axis about which the lever pivots preferably passes through the slidably mounted force trasmitting means where the steering mechanism is in the straight ahead position The arrangement is preferably such that the change in length of the variable length lever for a given amount of steering movement of the front wheels is greater when the front wheels approach full lock than when the front wheels are moving from the straight ahead position.

The invention further provides a vehicle having steered front wheels and rear wheels and a steering mechanism as described above.

It will be appreciated that a steering mechanism according to the invention may be used for a vehicle having only one front wheel or only one rear wheel.

BRIEF DESCRIPTION OF DRAWINGS

By way of example, two embodiments of a steering mechanism according to the invention will now be described with reference to the accompanying drawings, in which:

FIG. 1 is a side view of a first embodiment of a steering mechanism;

FIG. 2 is a view from above the mechanism of FIG. 1;

FIG. 3 is a front view, partly in section of the variable length lever of FIGS. 1 and 2;

FIG. 4 is a view from the left of FIG. 3;

FIG. 5 shows the variable length lever of FIGS. 3 and 4 in one position of maximum displacement;

FIG. 6 shows the variable length lever of FIGS. 3 and 4 in the other position of maximum displacement;

FIG. 7 shows a second embodiment of a variable length lever;

FIG. 8 shows diagrammatically a position of the variable length lever of FIG. 7 during steering movement in one direction; and FIG. 9 shows diagrammatically a position of the variable length lever of FIG. 7 during steering in the opposite direction to that of FIG. 8.

DETAILED DESCRIPTION

In FIGS. 1 and 2 a vehicle is diagrammatically represented as having conventional Ackerman type steering at the front and rear of the vehicle, shown at 10 and 11 respectively.

A conventional steering box 12 converts rotational movement of steering shaft 13 into rotational movement of arm 14 about pivot 15. To the end of the arm 14 are pivotally attached a front drag link 16, linear movement of the front drag link 16 causing direct steering movement of the front wheels 17 through Ackerman system 10, and an intermediate drag link 18 pivotally attached at its other end 20 to one side of a variable length lever mechanism generally shown at 19. To the other side of the variable length lever mechanism is connected one end 21 of rear drag link 22 which causes direct steering movement of the rear wheels 23 through Ackerman system 11.

FIGS. 3 and 4 show one embodiment of a variable length lever mechanism. A double ended lever 25 rotates about an upper fixed pivot 26. One end of the lever 25 is connected by means of a spherical joint 27 to the intermediate drag link 18 which is connected to the steering box 12. The other end of the lever 25 has a slotted portion 28 which is engaged by a spigot 29 and and roller 30, the spigot 29 and roller 30 being able to move along the slotted portion 28 from one end at a position coaxial with the pivot 26 to the other end of the slotted portion 28. Nuts 35 and 36 are rotatably mounted on screw threaded ends of the spigot 29 to hold together links 25 and 32 and spherical joint 31. A spherical joint 31 is mounted on the spigot 29 and the one end 21 of rear drag link 22, which drag link controls steering movement of the rear wheels, is connected to the spherical joint 31.

The position of the spigot 29 in the slotted portion 28 is determined by a pair of links 32 and 33. One end of the link 32 is pivotally mounted on the spigot 29 and the other end is pivotally connected to one end of the link 33 by a pivot joint 34. Nuts 37 and 38 mounted on screw threaded ends of shaft 39 maintain the pivotal connection between links 32 and 33. The other end of the link 33 is pivotally mounted on lower fixed pivot 40 about which the link 33 is free to rotate. The link 33 has a toothed quadrant 41 concentric with the lower fixed pivot 40. The toothed quadrant 41 engages a further toothed quadrant 42 concentric with the upper fixed pivot 26 formed on an extension 43 of the lever 25.

In operation, rotation of the steering shaft 13 causes rotation of the arm 14 about the pivot 15, thereby moving the front drag link 16 to cause steering movement of the front wheels 17 and moving the intermediate drag link 18 to cause rotation of the lever 25 about the upper fixed pivot 26. Movement of the spherical joint 27 corresponds to movement of the front drag link 16 controlling the front steering mechanism.

When the front wheels are in the straight ahead position the spigot 29 and consequently the spherical joint 31 are coaxial with the upper fixed pivot 26. Initial steering movement from the straight ahead position of the front wheels therefore causes negligible movement of the spigot 29 and hence negligible steering movement of the rear wheels, since the steering movement of the rear wheels in this arrangement is dependent on the position of the spigot 29 in the slotted portion 28 of the lever 25.

As steering movement takes place, lever 25 rotates about the upper fixed pivot 26. This rotation of lever 25 in turn causes rotation of the link 33 about the lower fixed pivot 40 due to the mutual engagement of toothed quadrants 42 and 41 on the lever 25 and the link 33 respectively. The rotation of the lever 25 thus causes the links 32 and 33 to move the spigot 29 along the slotted portion 28 of the lever 25. At full lock the spigot 29 reaches the end of the slotted portion 28 away from the pivot 26 as shown in FIGS. 5 and 6. In this way, steering movement of the rear wheels is progressively increased relative to the steering movement of the front wheels as the steering movement of the front wheels increases from zero to full lock. It will be appreciated that by varying the lengths of the links 32 and 33 and the lever 25 and the ratio of the toothed quadrants 41 and 42 to one another the characteristics of the front and rear steering movements can be varied.

An alternative embodiment of a variable length lever mechanism is shown in FIGS. 7, 8 and 9. In this mechanism the variable length of the lever is controlled by a pair of links and a bell crank in place of the two interconnected links and gear quadrants of the first embodiment. The other parts of the steering mechanism are the same as those described with reference to and as shown in FIGS. 1 and 2 of the drawings.

As shown in FIG. 7, a lever 50 pivots about a fixed pivot 51. The lever 50 has three arms, an upper arm 52, a middle arm 53 and a lower arm 54. The end of the upper arm 52 away from the pivot 51 is pivotally connected at point 55 to a drag link 56 from a conventional steering box. The lower arm 54 has a longitudinal slot 57 and a spigot and roller 58 may move along the slot 57. The spigot and roller 58 are connected to a rear drag link 59, the rear drag link 59 being in turn connected to the rear steering mechanism. The spigot and roller 58 are also connected to one end of a link 60 and the other end of the link 60 is connected to one arm 61 of a bell crank lever 62 by a pivot joint 63.

The bell crank lever 62 is rotatable about a fixed pivot 64. The other arm 65 of the bell crank lever 62 is connected by a further pivot 66 to a second link 67. The second link 67 is connected at its end away from the bell crank lever 62 to the middle arm 53 of the lever 50 by a pivot 68.

Movement of the upper arm 52 of the lever 50 corresponds to movement transmitted to the front steering mechanism in a similar way to the operation of the steering mechanism of the first embodiment.

With the front wheels in the straight ahead position, the longitudinal axis of the spigot and roller 58 is coincident with the axis of the fixed pivot of the lever 50. Thus small movement of the steering mechanism about the straight ahead position causes negligible movement of the spigot and roller 58, and hence negligible steering movement of the rear wheels.

As movement of the upper arm 52 of the lever 50 increases with further steering movement the spigot and roller 58 is caused to move along the slotted portion 57 by links 60 and 67 and the bell crank lever 27. At full lock, as shown diagrammatically in FIGS. 8 and 9, the spigot and roller 58 is at the extremity of the lower arm 54 of the lever 50.

In this way, steering movement of the rear wheels is progressively increased relative to the front wheels as the steering movement of the front wheels increases from zero to full lock. Variations in the lengths of the links 60 and 67 and the arms of the levers 50 and 62 will change the relationship between front and rear steering movement.

The advantage of these embodiments of the invention is that a steering mechanism is provided which has approximate characteristics of front wheel steering only when the vehicle is travelling in or near the straight ahead position, and the characteristics of both front and rear wheel steering when the wheels tend towards full lock.

I claim:

1. A steering mechanism for a vehicle having steered front and rear wheels, said mechanism comprising steering linkages for connection to both sets of wheels, the steering linkage to one set of wheels including a variable length lever and means to vary the length of the lever in response to the amount of steering movement imparted to the connection to the other set of wheels, the variable length lever comprising a lever partially mounted on a pivot, means for exerting a force on the lever to rotate the lever, and means slidably mounted on the lever for transmitting a steering force to said one set of wheels in response to rotational movement of the lever, the means to vary the length of the lever comprising a link mechanism for controlling the position of said slidably mounted force transmitting means on the lever in response to rotation of the lever, said link mechanism comprising a first link pivotally mounted at one end thereof to a fixed pivot, means to rotate the first link in response to rotation of the lever, and a second link, one end of the second link being pivotally secured to the other end of the first link and the other end of the second link being slidably mounted on the lever, the means for transmitting a steering force to the other set of wheels being connected to the other end of the second link.

2. A steering mechanism as claimed in claim 1 wherein the means to rotate the first link in response to rotation of the lever comprises a gearing mechanism.

3. A steering mechanism as claimed in claim 1 in which the variable length lever is included in the linkage to the rear set of wheels.

4. A steering mechanism as claimed in claim 3 in which the change in length of the variable length lever for a given amount of steering movement is greater when the front wheels approach full lock than when the front wheels are moving from the straight ahead position.

5. A steering mechanism for a vehicle having steered front and rear wheels, said mechanism comprising steering linkages for connection to both sets of wheels, the steering linkage to one set of wheels including a variable length lever and means to vary the length of the lever in response to the amount of steering movement imparted to the connection to the other set of wheels, the variable length lever comprising a lever pivotally mounted on a pivot, means for exerting a force on the lever to rotate the lever, and means slidably mounted on the lever for transmitting a steering force to said one set of wheels in response to rotational movement of the lever, the means to vary the length of the lever comprising a link mechanism for controlling the position of said slidably mounted force transmitting means on the lever in response to rotation of the lever, said link mechanism comprising an extension member extending from the lever, a first link, one end of the first link being pivotally connected to the extension member, the pivot axis of the pivotal connection of the first link to the extension member and the pivot axis of the lever defining a plane, the longitudinal axis of the lever being perpendicular to said plane, a substantially L-shaped member pivotally mounted intermediate its ends on a fixed pivot, the other end of the first link being pivotally connected to one end of the substantially L-shaped member, and a second link, one end of the second link being pivotally connected to the other end of the substantially L-shaped member and the other end of the second link being slidably mounted on the lever, the means for transmitting a steering force to the other set of wheels being connected to the other end of the second link.

6. A steering mechanism as claimed in claim 5 in which the variable length lever is included in the linkage to the rear set of wheels.

7. A steering mechanism as claimed in claim 6 in which the change in length of the variable length lever for a given amount of steering movement is greater when the front wheels approach full lock than when the front wheels are moving from the straight ahead position.

* * * * *